June 23, 1953  R. D. JUVE  2,643,125
GOLF BALL COVER
Filed Sept. 9, 1947

INVENTOR.
ROBERT D. JUVE
BY
R H Waters
ATTORNEY

Patented June 23, 1953

2,643,125

UNITED STATES PATENT OFFICE 2,643,125

GOLF BALL COVER

Robert D. Juve, Copley, Ohio, assignor to Wingfoot Corporation, Akron, Ohio, a corporation of Delaware Application September 9, 1947, Serial No. 773,088

3 Claims. (Cl. 273—62)

This invention relates to golf balls and more particularly to golf ball cover stock comprising a balata substitute.

The conventional golf ball is constructed primarily of a wound rubber thread center and a tough resilient cover. Many improvements have been made in the method of constructing the wound rubber thread center and some improvements have been made in the construction of the cover, but little progress has been made in finding new compositions that may be used in the golf ball cover. Balata, a natural occurring substance, has many characteristics that make it desirable as a golf ball cover stock and consequently balata has become the standard for comparison. Since it is necessary to rely upon nature as the only source of a satisfactory golf ball cover stock and since balata is the most expensive component of a golf ball, it is highly desirable to find a substitute having characteristics as good or better than the natural occurring balata, one that is more economical to use and one that is more readily obtainable.

Figure 1:
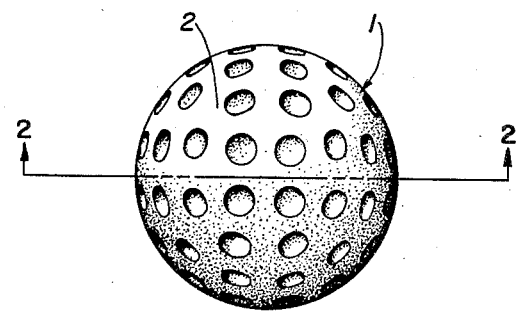
Figure 2:
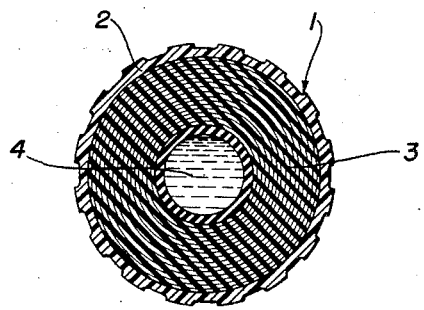

The invention is illustrated by the accompanying drawing. Fig. 1 is a representation of a golf ball having a cover comprising the material to which this invention relates. Fig. 2 is a cross section of the golf ball in Fig. 1 taken on line 2—2.

In Fig. 2, the golf ball comprises a cover 2 comprising a resin of the type disclosed or a mixture of such resin and balata, a winding 3, and a core 4.

It has now been discovered that a resinous material may be synthesized which, under certain conditions of use, satisfactorily replaces balata and under other conditions of use may be used as a diluent for balata. This synthetic resin is the product resulting from the reaction of a vinyl aromatic hydrocarbon and a conjugated diene hydrocarbon in which the former is present in an amount between about 75 parts and about 90 parts per 100 parts of these two components.

The preferred aromatic vinyl hydrocarbon component is styrene and the preferred conjugated hydrocarbons are butadiene-1,3 and isoprene. The preferred starting ratio of those components before polymerization is 85 parts of styrene to 15 parts of butadiene-1,3 or isoprene.

An important operation in the manufacture of golf balls is the bonding of the golf ball cover to the wound rubber thread center. A good bond may be obtained by molding the cover stock on the rubber thread center at a high temperature. However, the use of a high molding temperature is not desirable because the heat tends to deteriorate the compression characteristics of the rubber center resulting in a ball having lower resilience. However, it has been discovered that the balata substitute of this invention has a satisfactory rate of flow in the molding operation at conventional molding temperatures and, in fact, may be satisfactorily molded at temperatures lower than those used with other balata substitutes. Thus, it may be seen that the use of the balata substitute of this invention permits the production of a golf ball having higher resilience than those golf balls molded at higher temperatures. In addition to this successful bonding between the core and the cover, a good bond is also obtained between the seams of the cover where the cover is molded in place as two hemispheres.

The unexpected results observed with this balata substitute are obtained only when the styrene component is present in a predominant amount of at least 75 parts and not more than 90 parts per 100 parts of the two monomers. When the styrene is present in an amount higher than 90 parts, the resulting product has a softening point which necessitates the use of higher molding temperatures in order to obtain a satisfactory core-to-cover bond, whereas a product having less than 75 parts of styrene present will exhibit unfavorable resilience, hardness, and temperature stability.

The balata substitute of this invention may be used to produce a golf ball of either the vulcanized or the unvulcanized type. When a vulcanized ball is to be manufactured, it has been discovered that a formulation may be used in which no balata is present. A typical example of a compounding formula that may be used in the production of a vulcanized ball is shown as follows:

| | Parts by weight |
|---|---|
| Balata substitute | 60 |
| Pale crepe rubber | 40 |
| Stearic acid | 2 |
| ZnO | 1.5 |
| TiO$_2$ | 12 |
| Sulphur | 1.1 |
| Benzoic acid | 0.225 |
| Piperidinium pentamethylene dithiocarbamate | 0.375 |

The rubber component of this formulation may be either natural or synthetic. The stearic acid activates the cure and aids in processing on the mill and is merely an example of an activator that may be used for this purpose. Zinc oxide also functions as an activator and is an example of one that may be used. Titanium dioxide is a coloring pigment which may also be substituted. The dithiocarbamate is an example of an accelerator in curing the stock, and the benzoic acid is an example of a retarder that functions during the milling and during molding of the stock on the core.

A golf ball made with a cover stock in accordance with the above formula could be molded at a temperature of 220° F. for four minutes with the platens of the mold in heating contact with the ball, then the pressure of the mold is increased to cause the heated cover to flow into the threads and design of the mold for a period of about four minutes.

Another formulation which was used in the production of a vulcanized golf ball was as follows:

Parts by weight
| | |
|---|---|
| Balata substitute (85/15 styrene/butadiene copolymer) | 25 |
| Crude rubber | 40 |
| Balata | 60 |
| TiO$_2$ | 10 |
| ZnO | 6 |
| Stearic acid | 1.50 |
| Piperidinium pentamethylene dithiocarbamate | 0.4 |
| Sulphur | 1.25 |

A formulation similar to the above but without the use of sulphur and accelerator was used in making an unvulcanized cover.

Golf balls made with the above formulation and those made with a formulation containing 85 parts of balata, instead of 60 parts of balata and 25 parts of balata substitute, tested substantially the same in values concerning core-to-cover adhesion, cutting and compression. Thus, it may be seen that a more economical ball may be produced using the balata diluent of this invention in the production of either a vulcanized or unvulcanized product and a still more economical ball may be produced in using the styrene/butadiene resin as a balata substitute in the production of a vulcanized ball. In every case the desirable properties concerning core-to-cover adhesion, resistance to cutting and compression would be as favorable, if not more so, than if balata were used.

Other diene hydrocarbon monomers may be used in place of the preferred butadiene-1,3, including isoprene. However, the best results are obtained when the synthetic resin resulting from the polymerization of styrene and butadiene-1,3, in the proportions above mentioned, is used.

Through the use of the synthetic resin disclosed in this invention, it is possible to replace balata or balata-like materials used in the manufacture of golf ball cover stock. It is also possible to use the synthetic resin disclosed in this invention as a diluent for balata. It has also been shown that when this synthetic resin is used as a substitute or as a diluent for balata, it results in a golf ball having properties as desirable as those golf balls manufactured from conventional materials.

I claim:

1. A golf ball having a cover comprising a resin resulting from the polymerization of a mixture comprising 75 to 90 parts of styrene and 25 to 10 parts of a conjugated diene hydrocarbon.

2. A golf ball having a cover comprising balata and the resin resulting from the polymerization of a mixture comprising 85 parts of styrene and 15 parts butadiene-1,3.

3. A golf ball having a cover comprising balata and the resin resulting from the polymerization of a mixture comprising 85 parts styrene and 15 parts of isoprene.

ROBERT D. JUVE.

References Cited in the file of this patent

UNITED STATES PATENTS

| Number | Name | Date |
|---|---|---|
| 2,188,285 | Merrill | Jan. 23, 1940 |
| 2,318,547 | Welch | May 4, 1943 |
| 2,374,692 | Miller | May 1, 1945 |
| 2,477,316 | Sparks et al. | July 26, 1949 |

FOREIGN PATENTS

| Number | Country | Date |
|---|---|---|
| 514,924 | Great Britain | Nov. 21, 1939 |

OTHER REFERENCES

Industrial & Engineering Chemistry, vol. 38, No. 9, published September 1946, pgs. 955–958 cited.

Rubber Age of May 1946, page 211 cited.

India Rubber World, vol. 113, No. 6, published March 1946, pgs. 799–801 cited.